United States Patent
Doddek et al.

(10) Patent No.: US 6,842,680 B2
(45) Date of Patent: Jan. 11, 2005

(54) METHOD AND APPARATUS FOR CONTROLLING GROUND SPEED OF A WORK MACHINE BASED ON TIRE CONDITION

(75) Inventors: David J. Doddek, Decatur, IL (US); Giles K. Sorrells, Forsyth, IL (US)

(73) Assignee: Caterpillar Inc, Peoria, IL (US)

( * ) Notice: Subject to any disclaimer, the term of this patent is extended or adjusted under 35 U.S.C. 154(b) by 80 days.

(21) Appl. No.: 10/154,650

(22) Filed: May 23, 2002

(65) Prior Publication Data

US 2003/0220729 A1 Nov. 27, 2003

(51) Int. Cl.[7] .............................................. G06G 7/76
(52) U.S. Cl. ........................... 701/50; 701/93; 180/170
(58) Field of Search ............................... 701/29, 30–31, 701/35–36, 50, 93; 340/436, 439, 444; 702/173, 187; 180/170

(56) References Cited

U.S. PATENT DOCUMENTS 4,527,447 A  *  7/1985  Richards ....................... 477/78

* cited by examiner

Primary Examiner—Gertrude A. Jeanglaude
(74) Attorney, Agent, or Firm—Thomas L Derry; W Bryan McPherson

(57) ABSTRACT

The present invention provides a method and apparatus to automatically control the speed of a work machine 10 based on ton-miles-per-hour limit of at least one of a plurality of tires 12. A vehicle information system 28 having a processor 32 and a database 34 monitors an actual ton-miles-per-hour calculation of the plurality of tires 12. The vehicle information system 28 functions in combination with an electronic control module 66 of the machine 10 to trigger an automatic speed reduction should the actual ton-miles-per-hour rating exceed a predetermined limit. The speed reduction may be affected by at least one of reducing a throttle setting, changing a transmission gear and automatic application of the machine brakes.

32 Claims, 4 Drawing Sheets

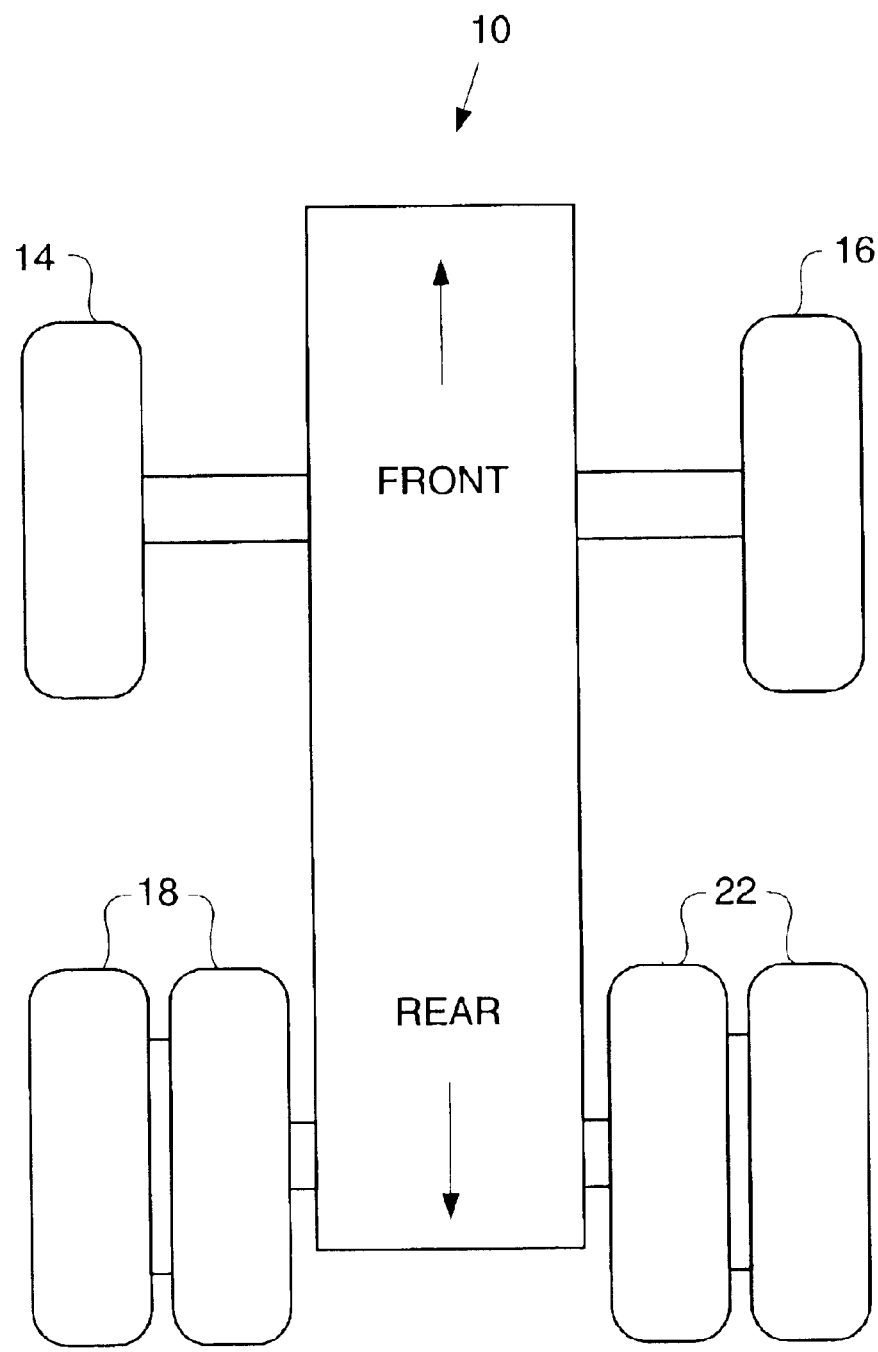
Fig_2_

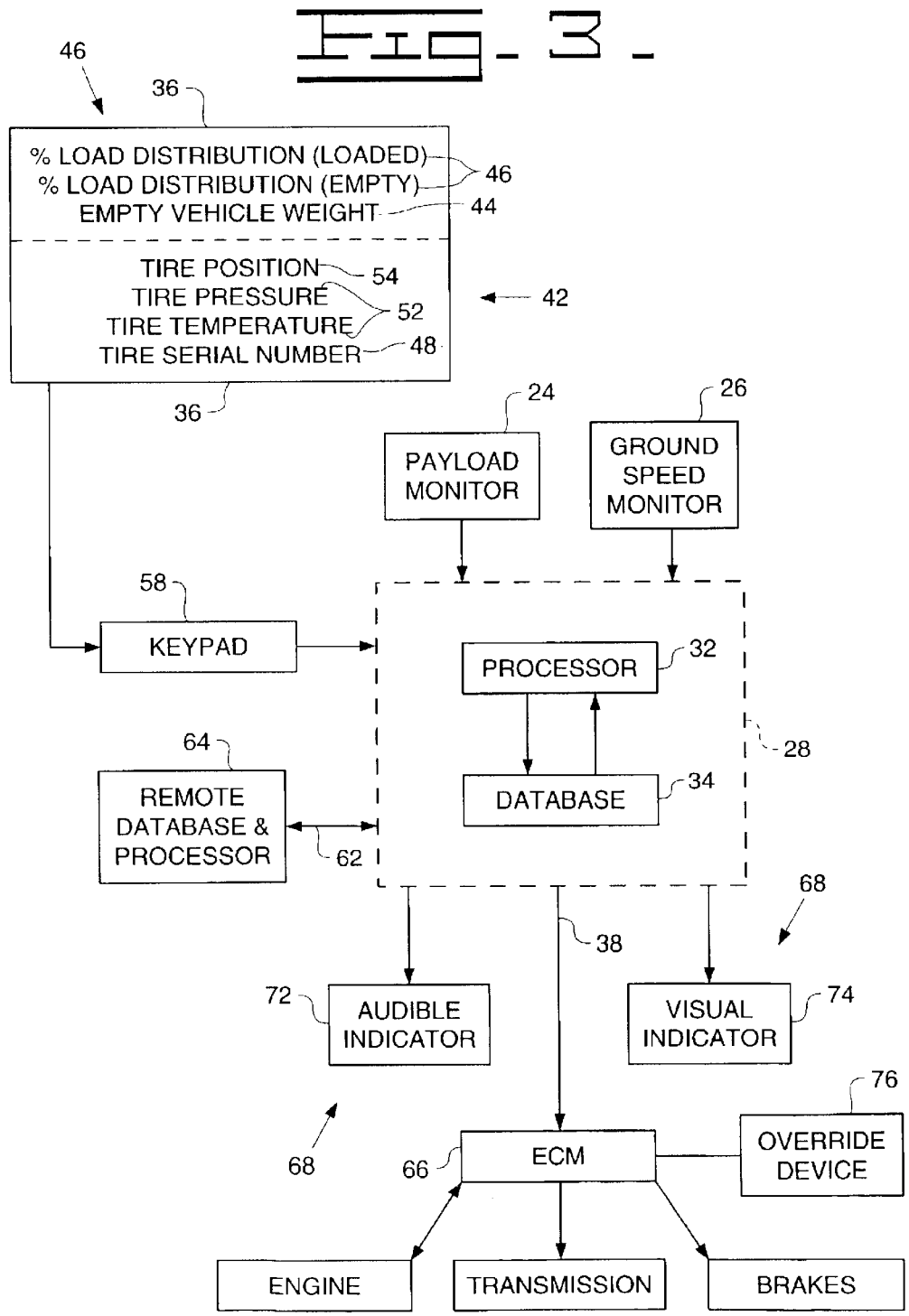

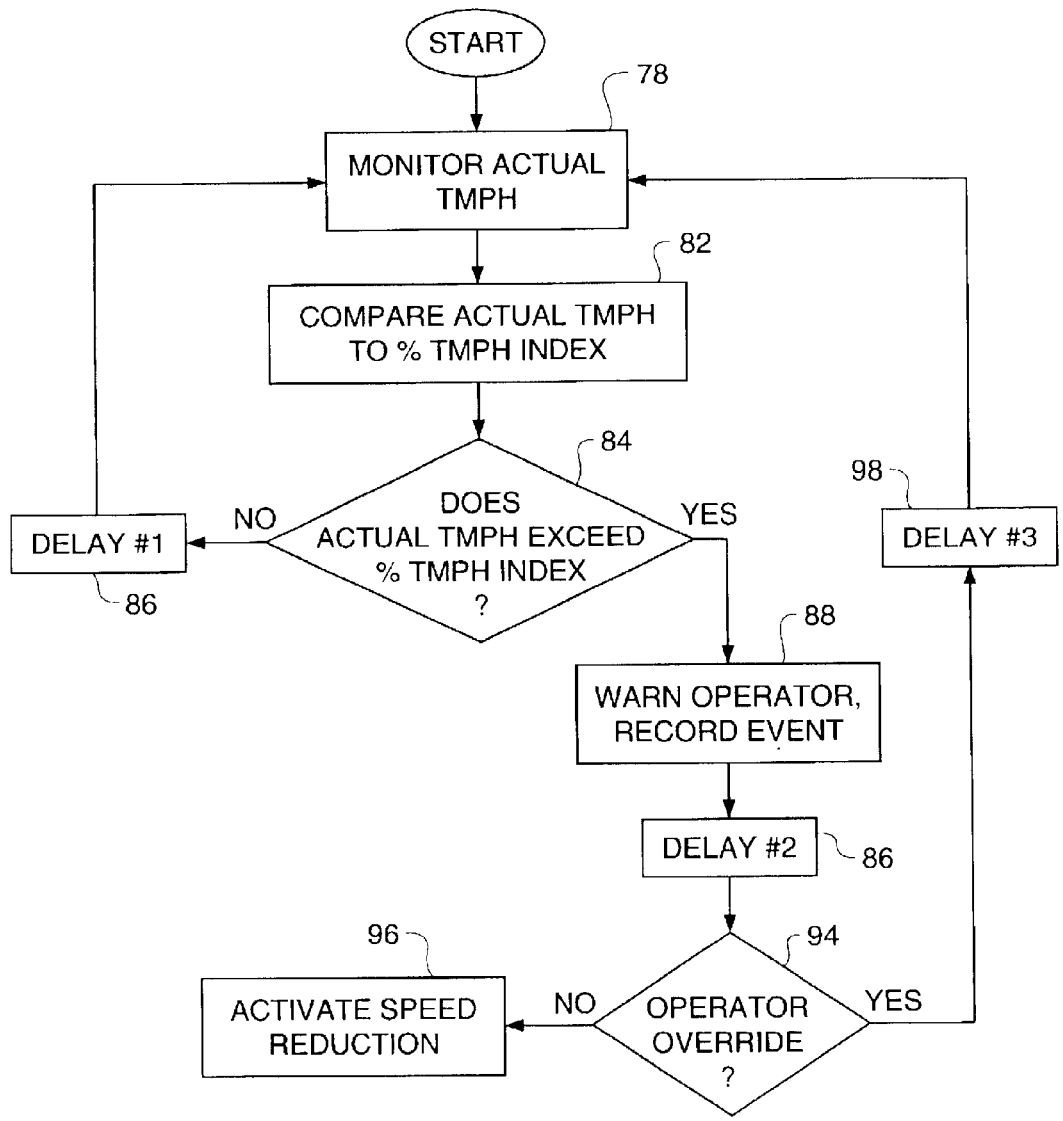
Fig-4-

METHOD AND APPARATUS FOR CONTROLLING GROUND SPEED OF A WORK MACHINE BASED ON TIRE CONDITION

TECHNICAL FIELD

The present invention relates generally to a method and apparatus to monitor tire condition on a work machine and, more particularly, to a method and apparatus to automatically limit the ground speed of the machine based on tire condition exceeding a predetermined value.

BACKGROUND

As a work machine travels, the tires on the machine generate heat. Excessive heat buildup may cause irreparable damage to the tire. The amount of heat generated is a function of the load being carried by the work machine and the speed that the machine travels. Tire life can be greatly effected by exposure to excessive heat. Tire manufactures follow a formula to rate tires for temperature buildup, it is commonly referred to as "Ton-Miles-Per-Hour". Ton-miles-per-hour utilizes a product of speed times load of each tire. Exceeding the ton-miles-per-hour rating of a tire dramatically increases the potential for tire failure. The likelihood of damage is increased with each incident exceeding ton-miles-per-hour.

Currently, ton-miles-per-hour is used as a standard indicator of the heat generated in a tire during normal use. Ton-miles-per hour is determined by calculating the average tire load and the average speed of a work machine, and multiplying the two averages to get an "average" ton-miles-per-hour figure. For example, in U.S. Pat. No. 6,044,313, Gannon discloses a system in which ton-miles-per-hour is calculated in real time. After determining that an event has exceeded a ton-miles-per-hour limitation a warning is given. The operator may choose to ignore the warning, which likely results in damage to the tire.

On large mining equipment, tires cost tens of thousand of dollars each. Even though these tires are designed to be recapped after the tread has been worn off, the carcass of a tire that has repeatedly exceeded the ton-miles-per-hour rating, is likely damaged beyond recapping. Unfortunately, damage from exceeding ton-miles per hour rating may not be visible, this may result in recapping a tire that should have been disposed of.

The present invention is directed to overcoming one or more of the problems as set forth above.

SUMMARY OF THE INVENTION

In one aspect of the present invention a method of controlling the speed of a work machine is provided. The method is based upon monitoring ton-miles-per-hour of at least one of a plurality of tires on the work machine. The method includes the steps of monitoring actual ton-miles-per-hour of at least one of said tires, comparing an actual ton-miles-per-hour rating to a predetermined ton-miles-per-hour limit, and causing the work machine to reduce speed, based on actual ton-miles-per-hour exceeding a percentage of the predetermined ton-miles-per-hour value.

In another embodiment of the present invention an apparatus for controlling the speed of a work machine based on monitoring ton-miles-per-hour of the work machine is provided. The apparatus includes a payload monitor adapted to generate a signal related to the weight of said machine, a speed monitor adapted to generate a signal related to the speed of the machine. Additionally a vehicle information system having a processor and a database transmits and receives a plurality of signals is provided. The vehicle information system monitors the machine speed and compares an actual ton-miles-per-hour value to a percentage of a predetermined ton-miles-per-hour value. If the actual ton-miles-per-hour exceeds the ton-miles-per-hour limit, the apparatus causes the machine speed to be reduced.

BRIEF DESCRIPTION OF THE DRAWINGS

FIG. 2 is a diagrammatic illustration of a top view of a portion of a work machine;

FIG. 3 is a block diagram illustrating an apparatus of the present invention; and FIG. 4 is a flow diagram illustrating a method of the present invention.

DETAILED DESCRIPTION

Figure 1:
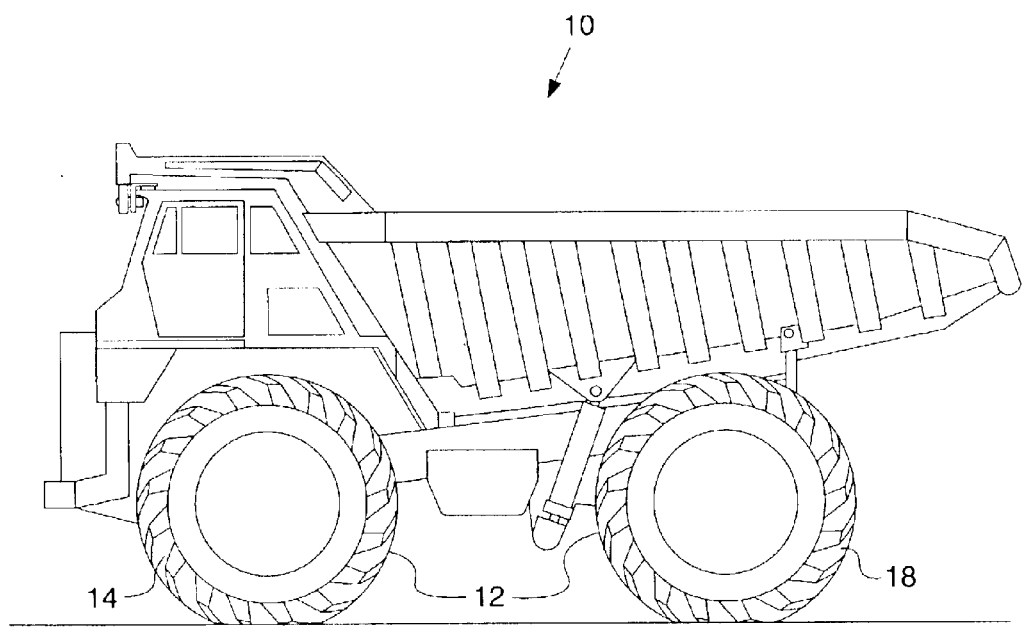
FIG. 1 is a diagrammatic illustration of a work machine used to haul a load.

Referring to the drawings, a method and apparatus for controlling the speed of a work machine based on ton-miles-per-hour is shown.

With particular reference to FIGS. 1 and 2, a work machine 10 is shown. The work machine 10 in FIG. 1 is depicted as an off-road mining truck. However, other types of work machines, e.g., on highway trucks, wheel loaders, road reclaimers, scrapers, and the like, may be used with the present invention.

The work machine 10 includes a plurality of tires 12 to enable the work machine 10 to move across the ground. Although the number or arrangement of tires is not critical to the present invention, a preferred embodiment having one left front tire 14, and one right front tire 16, and two left rear tires 18 and two right rear tires 22.

Referring now to FIG. 3, a block diagram of one embodiment of the present invention is shown.

A payload monitor 24 detects the weight of a load on the work machine 10. Payload monitors are well known in the art, examples include strut pressure monitors, truck bed pressure monitors, hydraulic cylinder and linkage pressure monitors, and the like. An exemplary payload monitor is disclosed in U.S. Pat. No. 4,635,739, which measures the pressure of fluids contained in the suspension struts of a work machine.

A ground speed monitor 26 is used to determine the speed of the work machine 10 as the machine travels. In a preferred embodiment, the ground speed monitor 26 senses the output speed of a transmission of the work machine 10, although a number of alternate manners, including radar and global positioning satellite systems, could be used.

The payload monitor 24 and ground speed monitor 26 generate respective payload and ground speed signals, which are delivered to a vehicle information system 28. The vehicle information system 28 includes a processor 32, preferably a microprocessor, and a database 34. The database 34 is used to store and retrieve data by the processor 32.

The vehicle information system 28 is adapted to send and receive a plurality of additional input signals 36 and output signals 38. Examples of desired input signals 36 include but are not limited to, individual tire data 42, empty vehicle weight 44 and load distribution 46 (loaded and unloaded). Individual tire data 42 may include but is not limited to, individual tire serial numbers 48, tire pressure 52, tire position 54 on the work machine 10 and ton-miles-per-hour limit 56 for each of the plurality of tires 12. Input signals 36 may be sent to the vehicle information system 28 via a number of input devices 58, such as a keypad (not shown), computer interface (not shown) or RF data link 62.

Examples of output signals 38 for the vehicle information system 28 include communication between an electronic control module 64 and the RF data link 62. It should be noted the RF data link 62 is a two-way communication system. The RF data link 62 may be used to transfer information between any of a plurality of work machines, a site office, service facility, remote processor and database 64.

The electronic control module 66 includes a processor for controlling and monitoring a plurality of engine parameters and machine systems. The electronic control module 66 will be referred to as a single device, although it is common to have a plurality of processors function simultaneously for controlling various machine systems, such as engine, brakes and transmission. Examples of operating parameters monitored by the electronic control module 66 include water temperature, oil temperature, oil pressure and crank case pressure. In a preferred embodiment the electronic control module 66 controls the engine speed (throttle setting), brakes or transmission to slow the machine.

The vehicle information system 28 is additionally configured to calculate actual ton-miles-per-hour values of one or more of the plurality of tires 12 as the work machine 10 is being operated. Actual tons-mile-per-hour for individual tires 12 is then compared to a ton-miles-per-hour limit that has been stored in the database 34. A ton-miles-per-hour event is determined when actual ton-miles-per-hour of at least one of the plurality of tires 12 is equal to or exceeds a predetermined percentage of the ton-miles-per-hour limit for the respective tire. A ton-miles-per-hour event may be classified by multiple levels based upon the severity of the event. For example, a level one event may be determined when actual ton-miles-per-hour reaches 90% of ton-miles-per-hour limit, a level two ton-miles-per-hour event may be determined when actual ton-miles-per-hour reaches 95% of ton-miles-per-hour limit and a level three ton-miles-per-hour event may be determined when actual ton-miles-per-hour reaches 100% of ton-miles-per-hour limit.

The vehicle information system 28 is also adapted to trigger a ton-miles-per-hour indicator 68 upon detection of a ton-miles-per-hour event. The ton-miles-per-hour indicator may include an audible indicator 72 and a visual indicator 74. The vehicle information system 28 may be configured to trigger either of the audible indicator 72 and the visual indicator 74 based upon the level of the ton-miles-per-hour event. The ton-miles-per-hour visual indicator 74 may also display the level of ton-miles-per-hour event. The ton-miles-per-hour visual indicator 74 may be any of a variety of display types, including graphic, numeric, warning light, etc. In addition to the vehicle information system 28 triggering the indicator, a signal is sent to the electronic control module 66 notifying of the ton-miles-per-hour event.

The electronic control module 64 is adapted to make an appropriate change in the work machine 10 operating parameters based upon the level of the ton-miles-per-hour event. For example, in response to a level one or level two event, the audible indicator 72 or visual indicator 74 may be used to notify the operator that he or she is beginning to approach the ton-miles-per-hour limit. In response to a level three ton-miles-per-hour event, the electronic control module 66 may cause the work machine 10 to reduce ground speed. The reduction of ground speed may be affected by at least one of reducing the throttle setting, changing of gearing of the transmission and applying the brakes.

An override device 76 is additionally provided in the operator cab. The override device 76 is adapted to allow the operator to prevent the electronic control module 66 from reducing the ground speed of the work machine 10. The operator override device 76 is preferably a momentary contact switch electrically connected to the vehicle information system 28 and mounted within easy reach of the operator. Upon activation of the override device 76, the vehicle information system 28 and electronic control module 66 allows the operator full control of the work machine 10 for a period of time determined by delay 3. When that period of time has expired, the vehicle information system 28 will restart monitoring the actual ton-miles-per-hour, and again trigger an appropriate indicator 68 should an event still exist.

Referring to FIG. 4 a flow diagram illustrating a method for monitoring ton-miles-per-hour is shown. In a first control block 78 using the weight of a load on the tires 12 machine speed the vehicle information system 28 determines actual ton-miles-per-hour for individual tires, or an average ton-miles-per-hour for the plurality of tires 12. In a second control block 82 the vehicle information system 28 compares actual ton-miles-per-hour to ton-miles-per-hour limits. If required, compensation is for load distribution may be done. Compensation may be performed based on predetermined parameters programmed into the vehicle information system 28 or by actual load distribution as provided by the payload monitor 24.

In a third control block 84, the processor 32 of the vehicle information system 28 determines if the ton-miles-per-hour limit for each of the plurality of tires 12 has been exceeded. If the ton-miles-per-hour limit has not been exceeded, the processor 32 returns to the first control block. A first time delay 86 may be provided prior to returning to the first control block 78. If the ton-miles-per-hour limit has been exceeded on any of the plurality of tires 12, control continues to the fourth control block 88, where the indicator 66 is triggered. Additionally, record of the event may be stored in the database 34. The record of the event may include individual tire data 42.

From control block four 88, a second delay 92 of a predetermined period may be provided. The second delay 92 is provided to give the operator an opportunity to override (fifth control block 94) the automatic speed reduction, control block six 96. In the event of an operator overriding fifth control block 94, a third delay 98 is provided prior to the control sequence returning to the first control block 78.

In an example embodiment, the actual ton-miles-per-hour for the front tires 14,16 and the actual ton-miles-per-hour for the rear tires 18,22 (ATMPHF, ATMPHR respectively) are calculated by first adding the empty vehicle weight (EVW) and payload (from payload monitor) to find a total load (TL) on the plurality of tires 12. The total load is then multiplied by a front weight distribution factor (FWD) and a rear weight distribution factor (RWD) to find total load front (TLF) and total load rear (TLR). For example, a typical work machine 10 may have a loaded weight distribution of 60% rear and 40% front. Total load front and total load rear is then multiplied by the ground speed to find actual ton-miles-per-hour front and rear. The actual ton-miles-per-hour front or rear is then divided by the number of tires front or rear, as the following equations illustrate.

$ATMPHR=((EVW+PAYLOAD*RWD)*\text{GROUND SPEED}/4)$ (Eq. 1)

$ATMPHF=((EVW+PAYLOAD*FWD)*\text{GROUND SPEED}/2)$ (Eq. 2)

In a second embodiment, the front and rear weight distribution ratios may be different for no load conditions than for full load conditions. The difference compensates for conditions where adding a load causes the distribution of the weight on the tires 12 to change. For example, the load distribution for an empty off road mining truck may be 50% over the rear tires and 50% over the front tires. However, when a load is added, the load distribution may change to 67% over the rear tires and 33% over the front tires. Since an off road mining truck will travel as much empty as loaded, the change in load distribution will have a substantial effect on ton-miles-per-hour calculations.

It is to be understood that the embodiment described above is an exemplary method for calculating actual tonmiles-per-hour of tires. Variations of the above equations may be used without deviating from the spirit of the present invention.

Referring again to FIG. 4, in a fifth control block 94, the ton-miles-per-hour calculations are stored in a database 34. The calculations are performed on a predetermined periodic basis. For example, it may be desired to perform the ton-miles-per-hour calculations ten times per second (10 Hz.), average the calculations once per hour, and store the averages in the database 34 as the work machine 10 travels. However, the calculations may be performed more frequently or less frequently, as desired.

The information stored in the database 34 may be used to determine trends or patterns of tire wear based on excessive values of ton-miles-per-hour. Additionally data related to events on specific tires may be stored and retrieved to create reports related to tire history. Tire history may in turn be used to determine if a tire carcass has been damaged, prior to recapping.

INDUSTRIAL APPLICABILITY

In operation the present invention monitors off road mining trucks as they carry loads of material from dig sites to dump sites, e.g., crushers, windrow dumps, and the like. The payload on each tire and the speed of the machine is used to calculate actual ton-miles-per-hour ratings of each tire. The actual ton-miles-per-hour rating is used to estimate heat build up in the tires.

The heat generated is also directly correlated with tire wear. Therefore, an accurate, real time monitor of ton-miles-per-hour can determine excessive tire wear. A ton-miles-per-hour indicator 68 can be used to notify an operator when ton-miles-per-hour exceeds a predetermined threshold, thus giving the operator an opportunity to modify driving performance to lower ton-miles-per-hour values. The ton-miles-per-hour indicator may consist of both an audible indicator 72 and a visual indicator 74, each of the indicators 68 may be adapted to activate at different percentages of the ton-miles-per-hour limit. If the operator does not modify his driving to reduce the actual ton-miles-per-hour the vehicle information system 28 causes the machine 10 to automatically slow down.

The automatic slowing of the machine 10 may be accomplished by one or more of the following; reducing throttle setting, changing the gear setting of the transmission and automatic application of the brakes. The processor 32 would be adapted to utilize a reduction of throttle first. If the speed does not begin to slow with the throttle reduction, the processor would next evaluate engine rpm, if engine rpm is below a predetermined value an automatic gear reduction can be actuated, should the engine rpm be above the predetermined value the brakes would be actuated periodically to reduce machine speed.

Additionally the second delay provides the operator an opportunity to preempt machine speed reduction, should he determine that a current or upcoming condition warrants. The machine speed reduction may be preempted by actuating the override device 76.

Other aspects, objects, and features of the present invention can be obtained from a study of the drawings, the disclosure, and the appended claims.

What is claimed is:

1. A method of controlling the speed of a work machine, as the machine moves across the ground, based on vehicle speed and payload on at least one of a plurality of tires on the work machine, including the steps of:
    monitoring a first value that is function of vehicle speed and payload of at least one of said plurality of tires;
    comparing said first value to a predetermined second value;
    determining to cause said work machine to reduce speed based on an event of said first value exceeding said second value;
    providing an operator an ability to override said determination; and
    automatically causing said work machine to reduce speed, in response to said determination not being overridden.

2. The method of controlling the speed of a work machine of claim 1, wherein said second value is a ton-miles-per hour limit.

3. The method of controlling the speed of a work machine of claim 1, wherein said step of causing said work machine to reduce speed includes reducing a throttle setting.

4. The method of controlling the speed of a work machine of claim 1, wherein said step of causing said work machine to reduce speed includes the step of shifting a transmission.

5. The method of controlling the speed of a work machine of claim 1, wherein said step of causing said work machine to reduce speed includes the step of actuating a brake mechanism.

6. The method of controlling the speed of a work machine of claim 1, including a step of warning an operator of said event of actual ton-miles-per-hour exceeding said predetermined ton-miles-per-hour limit.

7. The method of controlling the speed of a work machine of claim 6, wherein said step of warning said operator happens prior to said step of causing said machine to reduce speed.

8. The method of controlling the speed of a work machine of claim 1 including the step of storing a record of said event in a database.

9. The method of controlling the speed of a work machine of claim 8, wherein said step of storing a record of said event includes transmitting said record to a remote database.

10. The method of controlling the speed of a work machine of claim 8, wherein said step of storing a record of said event includes maintaining a history events related to an individual tire.

11. The method of controlling the speed of a work machine of claim 1 including the step of compensating for uneven weight distribution on the plurality of tires of said work machine.

12. The method of controlling the speed of a work machine of claim 1 including the step of including a delay after the step of comparing said actual ton-miles-per-hour to said predetermined ton-miles-per-hour limit and prior to said step of reducing speed.

13. An apparatus for controlling the speed of a work machine, as the work machine moves across the ground, said control being based on monitoring work machine speed and payload on at least one of a plurality of tires on the work machine, said apparatus comprising:
    a payload monitor adapted to generate a signal related to a payload of said machine on said plurality of tires;
    a ground speed monitor adapted to generate a signal related to the speed of said work machine across the ground; and
    a vehicle information system having a processor and a database being adapted to transmit and receive a plurality of signals, wherein said vehicle information system monitors said work machine speed and said payload of at least one of said plurality of tires and compares first value that is a function of speed and payload on one of said plurality of tires and a predetermined a second value, determines to cause said work machine to reduce speed based on an event of said first value exceeding said second value, provides an operator an ability to override said determination, and automatically causing said machine ground speed to be reduced in in response to said determination not being overridden.

14. The apparatus of claim 13, wherein said second value is a ton-miles-per-hour limit.

15. The apparatus of claim 13, wherein said vehicle information system is adapted to reduce the speed of the machine by one of reducing a throttle setting, shifting a transmission and actuating a braking system.

16. The apparatus of claim 13 including an indicator adapted to notify an operator that said exceeding event has occurred.

17. The apparatus of claim 16 wherein said indicator is an audible indicator.

18. The apparatus of claim 16 wherein said indicator is a visual indicator.

19. The apparatus of claim 13 including an override device adapted to allow the operator to prevent said work machine speed from being reduced.

20. The apparatus of claim 13 including an input device adapted to input at least one of a plurality of machine parameters into said database.

21. The apparatus of claim 20 wherein said input device is a keypad.

22. The apparatus of claim 13 including a data link adapted to transmit data between said vehicle information system and a remotely located database.

23. The apparatus of claim 13, wherein said act of reducing said machine speed is nullified as a result of said work machine undergoing a critical machine failure.

24. The apparatus of claim 13, wherein said act of reducing said work machine speed is nullified as a result of the operator applying a brake.

25. The apparatus of claim 13, wherein said act of reducing said work machine speed is nullified as a result of the engine exceeding an over-speed limit.

26. A method of controlling the speed of a work machine, as the machine moves across the ground, based on vehicle speed and payload on at least one of a plurality of tires on the work machine, including the steps of:
   monitoring a first value that is function of vehicle speed and payload of at least one of said plurality of tires;
   comparing said first value to a predetermined second value;
   determining to cause said work machine to reduce speed in response to said comparison;
   notifying an operator in response to said first value exceeding said second value;
   establishing a delay time period in response to said notification during which an operator may override said determination; and
   automatically causing said work machine to reduce speed in response to said delay time period expiring and said determination not being overridden.

27. A method, as set forth in claim 26 wherein the step of notifying said operator further includes the steps of:
   selecting one of a plurality of notifications in response to an amount the first value exceeds the second value; and
   notifying said operator using the selected notification.

28. A method, as set forth in claim 26, further comprising the step of determining a tire rating in response to the first value exceeding the second value.

29. A method, as set forth in claim 1, wherein the step of automatically causing said work machine to reduce speed further comprises the steps of:
   determining one of a plurality of speed reduction techniques to use in response to a current operating environment of said machine; and
   automatically causing said work machine to reduce speed in response to said determined speed reduction technique.

30. A method, as set forth in claim 1, further including the step of delaying said work machine speed reduction a period of time in response to said determination being overridden.

31. A method, as set forth in claim 30, further comprising the step of automatically causing said work machine to reduce speed in response to an expiration of said delay time period.

32. A method, as set forth in claim 10, further comprising the step of determining whether a tire carcass has been damaged in response to said history.

* * * * *

UNITED STATES PATENT AND TRADEMARK OFFICE
CERTIFICATE OF CORRECTION

PATENT NO. : 6,842,680 B1
DATED : January 11, 2005
INVENTOR(S) : David J. Doddek et al.

It is certified that error appears in the above-identified patent and that said Letters Patent is hereby corrected as shown below:

Title page,
Item [56], References Cited, U.S. PATENT DOCUMENTS, please add:
-- US  4,343,338  08/10/1982  Hart
   US  4,620,580  11/04/1986  Groezinger et al.
   US  5,070,959  12/10/1991  Grabowski
   US  5,416,706  5/16/1995   Hagenbuch
   US  5,557,552  9/17/1996   Naito et al.
   US  5,631,832  5/20/1997   Hagenbuch
   US  5,741,966  4/21/1998   Handfield et al.
   US  5,749,984  5/12/1998   Frey et al.
   US  6,044,313  3/28/2000   Gannon
   US  6,202,021  3/13/2001   Kresse et al.
   US  6,230,554  5/15/2001   Kramer
   US  6,243,007  6/5/2001    McLaughlin et al.
   US  6,278,361  8/21/2001   Magiawala et al.
   US  6,434,470  8/13/2002   Nantz et al. --
FOREIGN PATENT DOCUMENTS, please add:
-- EP  1106397A2  6/13/2001   Amglawala et al. --

Signed and Sealed this

Eighth Day of March, 2005

JON W. DUDAS
*Director of the United States Patent and Trademark Office*